(12) United States Patent
Gupta et al.

(10) Patent No.: US 12,405,741 B2
(45) Date of Patent: Sep. 2, 2025

(54) DYNAMIC DATA RELOCATION USING CLOUD BASED RANKS

(71) Applicant: International Business Machines Corporation, Armonk, NY (US)

(72) Inventors: Lokesh Gupta, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/521,782

(22) Filed: Jul. 25, 2019

(65) Prior Publication Data

US 2019/0347032 A1     Nov. 14, 2019

Related U.S. Application Data

(63) Continuation of application No. 15/704,775, filed on Sep. 14, 2017, now Pat. No. 10,372,371.

(51) Int. Cl.
    *G06F 12/00*         (2006.01)
    *G06F 3/06*         (2006.01)
        (Continued)

(52) U.S. Cl.
    CPC .......... *G06F 3/0647* (2013.01); *G06F 3/0604* (2013.01); *G06F 3/0631* (2013.01);
        (Continued)

(58) Field of Classification Search
    CPC .... G06F 3/0631; G06F 3/0604; G06F 3/0659; G06F 3/0665; G06F 3/0689;
        (Continued)

(56) References Cited

U.S. PATENT DOCUMENTS 5,978,892 A * 11/1999 Noel .................... G06F 12/023
                                             707/999.202
6,269,431 B1    7/2001   Dunham
            (Continued)

FOREIGN PATENT DOCUMENTS

CN        101719106 A    6/2010
CN        102467408 A    5/2012
            (Continued)

OTHER PUBLICATIONS

Anonymous, "A system and method to create a cost efficient mobility solution of storing data in public clouds", An IP.com Prior Art Database Technical Disclosure. IP.com No. IPCOM000232553D, Nov. 15, 2013. 10 pages.

(Continued)

*Primary Examiner* — Mark A Giardino, Jr.
(74) *Attorney, Agent, or Firm* — James L. Olsen

(57) ABSTRACT

An example method for dynamic data relocation using cloud based ranks comprises monitoring accesses to data stored on a plurality of local ranks of an enterprise storage system; identifying data which has not been accessed for a predetermined amount of time based on the monitored accesses; and moving the data which has not been accessed for the predetermined amount of time to one or more cloud based ranks of the enterprise storage system, wherein each cloud based rank comprises storage space on one or more cloud storage devices, the storage space on the one or more cloud storage devices mapped to corresponding virtual local addresses that are grouped as a virtual local rank.

17 Claims, 4 Drawing Sheets

(51) Int. Cl.
  *H04L 67/1097* (2022.01)
  *H04L 67/5682* (2022.01)
  *G06F 13/00* (2006.01)
  *G06F 13/28* (2006.01)

(52) U.S. Cl.
  CPC .......... *G06F 3/0649* (2013.01); *G06F 3/0653* (2013.01); *G06F 3/0659* (2013.01); *G06F 3/0665* (2013.01); *G06F 3/067* (2013.01); *G06F 3/0689* (2013.01); *H04L 67/1097* (2013.01); *H04L 67/5682* (2022.05)

(58) Field of Classification Search
  CPC ...... G06F 3/0653; G06F 3/0647; G06F 3/067; G06F 3/0649; H04L 67/1097; H04L 67/2852
  See application file for complete search history.

(56) References Cited

U.S. PATENT DOCUMENTS

| | | |
|---|---|---|
| 6,996,741 B1 | 2/2006 | Pittelkow |
| 7,028,158 B1 | 4/2006 | Beatty |
| 7,225,211 B1 | 5/2007 | Colgrove |
| 8,370,312 B1 | 2/2013 | Sawhney |
| 8,484,416 B2 | 7/2013 | Smith |
| 8,555,022 B1* | 10/2013 | Edwards ............... G06F 3/0649 |
| | | 711/170 |
| 8,612,284 B1 | 12/2013 | Sharif |
| 8,745,327 B1 | 6/2014 | Throop |
| 8,972,778 B2 | 3/2015 | Kulkarni |
| 9,021,204 B1 | 4/2015 | Awasthi |
| 9,128,948 B1 | 9/2015 | Raorane |
| 9,210,100 B2 | 12/2015 | Van Der Linden |
| 9,268,493 B2 | 2/2016 | Kamalavannan |
| 9,378,093 B2 | 6/2016 | Cooper |
| 9,411,539 B2* | 8/2016 | Chiu ..................... G06F 3/0659 |
| 9,432,298 B1 | 8/2016 | Smith |
| 9,454,473 B2 | 9/2016 | Luan |
| 9,513,968 B1* | 12/2016 | Fiske .................... G06F 3/0685 |
| 9,552,248 B2 | 1/2017 | Miller |
| 9,632,707 B2 | 4/2017 | Hyde, II |
| 9,646,010 B2 | 5/2017 | Mokhtarzada |
| 9,665,303 B1 | 5/2017 | Huff |
| 9,749,193 B1 | 8/2017 | Rokicki |
| 10,097,635 B2 | 10/2018 | Makida |
| 10,237,343 B1* | 3/2019 | Wigmore ................ H04L 67/51 |
| 10,372,363 B2 | 8/2019 | Gupta et al. |
| 10,372,371 B2 | 8/2019 | Gupta et al. |
| 2008/0154776 A1* | 6/2008 | Xia ........................... G06F 8/62 |
| | | 705/51 |
| 2008/0201523 A1 | 8/2008 | Ash |
| 2010/0042720 A1 | 2/2010 | Stienhans |
| 2010/0131324 A1 | 5/2010 | Ferris |
| 2010/0161759 A1 | 6/2010 | Brand |
| 2010/0333116 A1 | 12/2010 | Prahlad |
| 2011/0022812 A1 | 1/2011 | Van Der Linden |
| 2011/0271067 A1 | 11/2011 | Chou |
| 2012/0016838 A1 | 1/2012 | Arai |
| 2012/0047107 A1 | 2/2012 | Doddavula |
| 2012/0246310 A1 | 9/2012 | Broda |
| 2013/0138908 A1 | 5/2013 | Iwasaki |
| 2013/0159637 A1 | 6/2013 | Forgette |
| 2013/0212345 A1 | 8/2013 | Nakajima |
| 2013/0218919 A1 | 8/2013 | Solonchev |
| 2013/0332700 A1 | 12/2013 | Kopylovitz |
| 2014/0032850 A1 | 1/2014 | Phelan |
| 2014/0052864 A1 | 2/2014 | Van Der Linden |
| 2014/0223576 A1 | 8/2014 | Zhao |
| 2014/0280387 A1 | 9/2014 | Lin |
| 2014/0337576 A1 | 11/2014 | Burton |
| 2015/0112944 A1 | 4/2015 | Wu |
| 2015/0227468 A1 | 8/2015 | Berger |
| 2016/0004481 A1 | 1/2016 | Lakshman |
| 2016/0048532 A1 | 2/2016 | Islam |
| 2016/0139835 A1* | 5/2016 | Fiebrich-Kandler ...................... G06F 3/0608 |
| | | 711/114 |
| 2016/0162438 A1* | 6/2016 | Hussain ................ G06F 3/0683 |
| | | 709/212 |
| 2016/0197834 A1 | 7/2016 | Luft |
| 2016/0314079 A1 | 10/2016 | Medovich |
| 2016/0378518 A1 | 12/2016 | Antony |
| 2017/0013057 A1 | 1/2017 | Shani |
| 2017/0016373 A1 | 1/2017 | Middleton, Jr. |
| 2017/0039218 A1 | 2/2017 | Prahlad |
| 2017/0075907 A1 | 3/2017 | Goswami |
| 2017/0160951 A1 | 6/2017 | Borlick |
| 2017/0163731 A1 | 6/2017 | Borlick |
| 2017/0262347 A1 | 9/2017 | Dornemann |
| 2017/0277435 A1 | 9/2017 | Wadhwa |
| 2017/0343988 A1* | 11/2017 | Ziegler ................ G06Q 10/087 |
| 2018/0024853 A1 | 1/2018 | Warfield |
| 2018/0113734 A1 | 4/2018 | Yamato |
| 2018/0122124 A1* | 5/2018 | Thornton ........... G06K 9/00268 |
| 2018/0122148 A1* | 5/2018 | Janzer ..................... G06T 19/20 |
| 2019/0079686 A1 | 3/2019 | Gupta |
| 2019/0079693 A1 | 3/2019 | Gupta |
| 2019/0082008 A1 | 3/2019 | Gupta |
| 2019/0082009 A1 | 3/2019 | Gupta |
| 2019/0095458 A1 | 3/2019 | Saradhi |
| 2019/0179805 A1 | 6/2019 | Prahlad |
| 2019/0347024 A1 | 11/2019 | Gupta et al. |
| 2021/0191861 A1* | 6/2021 | Dalmatov ........... G06F 12/0802 |

FOREIGN PATENT DOCUMENTS

| | | |
|---|---|---|
| CN | 102792277 A | 11/2012 |
| CN | 104052770 A | 9/2014 |
| CN | 104820575 A | 8/2015 |
| CN | 105827669 A | 8/2016 |
| CN | 103237054 B | 12/2016 |
| CN | 106462504 A | 2/2017 |
| CN | 106663022 A | 5/2017 |
| CN | 111095188 A | 5/2020 |
| CN | 111095189 A | 5/2020 |
| CN | 111095903 A | 5/2020 |
| CN | 104778129 B | 8/2021 |
| DE | 112018003524 T5 | 4/2020 |
| DE | 112018005121.8 T5 | 6/2020 |
| DE | 112018005135.8 T5 | 6/2020 |
| GB | 2579992 A | 7/2020 |
| GB | 2580259 A | 7/2020 |
| GB | 2580263 A | 7/2020 |
| JP | 2012524946 A | 10/2012 |
| JP | 2013511104 A | 3/2013 |
| JP | 2013114624 A | 6/2013 |
| JP | 2014175004 A | 9/2014 |
| JP | 2014530415 A | 11/2014 |
| JP | 2015501494 A | 1/2015 |
| JP | 2015191324 A | 11/2015 |
| JP | 2017130103 A | 7/2017 |
| JP | 2020-533678 A | 11/2020 |
| JP | 2020-533689 A | 11/2020 |
| JP | 2020-533694 A | 11/2020 |
| WO | 2013066482 A1 | 5/2013 |
| WO | 2016132572 A1 | 8/2016 |
| WO | 2019/053565 A1 | 3/2019 |
| WO | 2019053533 A1 | 3/2019 |
| WO | 2019053534 A1 | 3/2019 |

OTHER PUBLICATIONS

Anonymous, "Data Migration and I/O Throttling to Reduce Temperature Hot Spots in a storage controller", An IP.com Prior Art Database Technical Disclosure. IP.com No. IPCOM000208028D. Jun. 20, 2011. 4 pages.

Anonymous, "Define virtual storage pool attributes based on storage volumes to be migrated", An IP.com Prior Art Database Technical Disclosure. IP.com No. IPCOM000234650D, Jan. 24, 2014. 7 pages.

(56) References Cited

OTHER PUBLICATIONS

Anonymous, "Dynamic Model For Storage In A Cloud Environment With Quality of Service Feature", An IP.com Prior Art Database Technical Disclosure. IP.com No. IPCOM000209739D, Aug. 12, 2011. 5 pages.

Anonymous, "Method and System for Assigning Storage Access Priorities to Input/output Intensive Host Applications in a Cloud Storage Network", An IP.com Prior Art Database Technical Disclosure. IP.com No. PCOM000236547D, May 2, 2014. 7 pages.

Anonymous, "Method and System for Pre-Allocating Virtual Disks in a Cloud Environment", An IP.com Prior Art Database Technical Disclosure. IP.com No. IPCOM000220121D, Jul. 23, 2012. 3 pages.

Anonymous, "Optimize data migration in a system which mixes local storage devices and Cloud Storage", An IP. com Prior Art Database Technical Disclosure. IP.com No. IPCOM000238089D, Aug. 1, 2014. 4 pages.

Anonymous, "Policy-driven method and system to automate the provisioning of shared storage space in a cloud environment", An IP.com Prior Art Database Technical Disclosure. IP.com No. IPCOM000220017D, Jul. 18, 2012. 5 pages.

Anonymous, "Smart Device Cloud", An IP.com Prior Art Database Technical Disclosure. IP.com No. PCOM000206936D, May 13, 2011. 15 pages.

Anonymous, "Smarter Method to Achieve Multi-tenancy at the RAID Level", An IP.com Prior Art Database Technical Disclosure. IP.com No. IPCOM000204434D, Feb. 24, 2011. 6 pages.

Anonymous, "System and method for enhancing high data rate mobile application performance by tiering between multiple storage cards", An IP.com Prior Art Database Technical Disclosure. IP.com No. IPCOM000245740D, Apr. 4, 2016. 10 pages.

Dufrasne et al., "IBM DS8000 Easy Tier", IBM Redbooks, International Technical Support Organization, Aug. 2016. http://www.redbooks.ibm.com/abstracts/redp4667.html 166 pages.

Gupta et al., "Thin Provisioning Using Cloud Based Ranks", U.S. Appl. No. 16/521,722, filed Jul. 25, 2019.

IBM, "Rules Based Storage Cloud", An IP.com Prior Art Database Technical Disclosure. IP.com No. PCOM000181667D, April, 8, 2009. 3 pages.

International Search Report and Written Opinion for International Application No. PCT/IB2018/056279, filed Aug. 20, 2018.

International Search Report and Written Opinion for International Application No. PCT/IB2018/056280 filed Aug. 20, 2018.

International Search Report and Written Opinion for International Application No. PCT/IB2018/056795, filed Sep. 6, 2018.

List of Patents or Patent Applications Treated as Related, dated Jul. 24, 2019. 2 pages.

Mell et al., "The NIST Definition of Cloud Computing", National Institute of Standards and Technology, Special Publication 800-145, Sep. 2011. 7 pages.

Ruiu et al., "Automatic Dynamic Allocation of Cloud Storage for Scientific Applications," 2015 Ninth International Conference on Complex, Intelligent, and Software Intensive Systems, Aug. 13, 2015, pp. 209-216.

Unknown, "Amazon S3 Reduced Redundancy Storage", Amazon, 2017. https://aws.amazon.com/s3/reduced-redundancy/ last accessed Aug. 24, 2017. 7 pages.

Unknown, "Amazon S3 Storage Classes", https://aws.amazon.com/s3/storage-classes/ last accessed Aug. 24, 2017. 7 pages.

Unknown, "Amazon S3", Amazon, 2017. https://aws.amazon.com/s3/, last accessed Aug. 24, 2017. 9 pages.

Unknown, "Cloud-integrated Storage—What & Why", Microsoft, Mar. 2013. 10 pages.

Unknown, "Cohesity Cloud Integration Solution Overview and Value Proposition", COHESITY, 2016. 2 pages.

Unknown, "Disk Storage DS8000 Overview", Lascon Storage, http://www.lascon.co.uk/hwd-ds8k-overview.php last accessed Aug. 24, 2017. 6 pages.

Unknown, "HyperSwap function", IBM, 2016. https://www.ibm.com/support/knowledgecenter/en/STVLF4_7.7.1/spectrum.virtualize.771.doc/svc_hyperswapovr.html 1 page.

Unknown, "IBM Easy Tier", IBM, Jun. 5, 2015. https://www.ibm.com/support/knowledgecenter/en/HW213_7.3.0/com.ibm.storage.ssic.help.doc/f2c_autodatareloc_lfa4gd.html 4 pages.

Unknown, "Overview of IBM Cloud Manager with OpenStack", IBM, 2015. https://www.IBM.com/support/knowledgecenter/en/SST55W_4.3.0/liaca/liaca_overview.html 1 page.

Unknown, "Types of Data Replication", IBM, Copyright 2002, 2009. https://www.ibm.com/support/knowledgecenter/en/SSSKXG_1.4.0.1/com.ibm.sspc_v1401.doc/frg_c_sspc_ct.html 10 pages.

Westphal et al., "IBM System Storage DS8000 Architecture and Implementation", IBM Redbooks, International Technical Support Organization, Nov. 2012. www.redbooks.ibm.com/redbooks/pdfs/sg248886.pdf 534 pages.

Notice of Reasons for Refusal—Application number: Japanese Patent Application No. 2020-513868, Date of Drafting: Riewa 4 Jan. 21, 2022, Tadao 6306 5S00, Representative/Applicant: Jeno, Takeshi (one others), Applied Provisions: Article 36 (6) (ii) (Clarity Requirement), 4 PGS.

Notice of Reasons for Refusal—Application number: Japanese Patent Application No. 2020-513689, Date of Drafting: Riewa 4 Feb. 2, 2022 Patent Examiner: Tanaami, Tadao 6306 5S00, Representative/Applicant: Jeno, Takeshi (one others), Applied Provisions: Article 36 (6) (ii) (Clarity Requirement), 6 PGS.

"Notice of Reasons for Refusal", Japanese Patent Application No. 2020-514287, Date of Drafting: Reiwa 4 Jan. 26, 2022, 1594-5s00, Representative/Applicant: Ueno, Takeshi (one others), Applied Provisions: Article 29 (2) (Inventive Step) Article 36 (6) (ii) (Clarity Requirement), 6 Pgs.

* cited by examiner

DYNAMIC DATA RELOCATION USING CLOUD BASED RANKS

BACKGROUND

Storage networks, such as storage area networks (SANs), are used to interconnect different types of data storage systems with different types of servers (also referred to herein as "host systems"). Some servers involve various hardware such as data storage media, storage controllers, memories, and the accompanying power systems, cooling systems, etc.

Storage controllers control access to data storage media and memories in response to read and write requests. The storage controllers may direct the data in accordance with data storage devices such as RAID (redundant array of independent disks), JBOD (just a bunch of disks), and other redundancy and security levels. As an example, an IBM® ESS (Enterprise Storage Server) such as a DS8000 series has redundant clusters of computer entities, cache, non-volatile storage, etc.

SUMMARY

Aspects of the disclosure may include a computer implemented method, computer program product, computing device, and system for dynamic data relocation using cloud based ranks. An example method comprises monitoring accesses to data stored on a plurality of local ranks of an enterprise storage system; identifying data which has not been accessed for a predetermined amount of time based on the monitored accesses; and moving the data which has not been accessed for the predetermined amount of time to one or more cloud based ranks of the enterprise storage system, wherein each cloud based rank comprises storage space on one or more cloud storage devices, the storage space on the one or more cloud storage devices mapped to corresponding virtual local addresses that are grouped as a virtual local rank.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
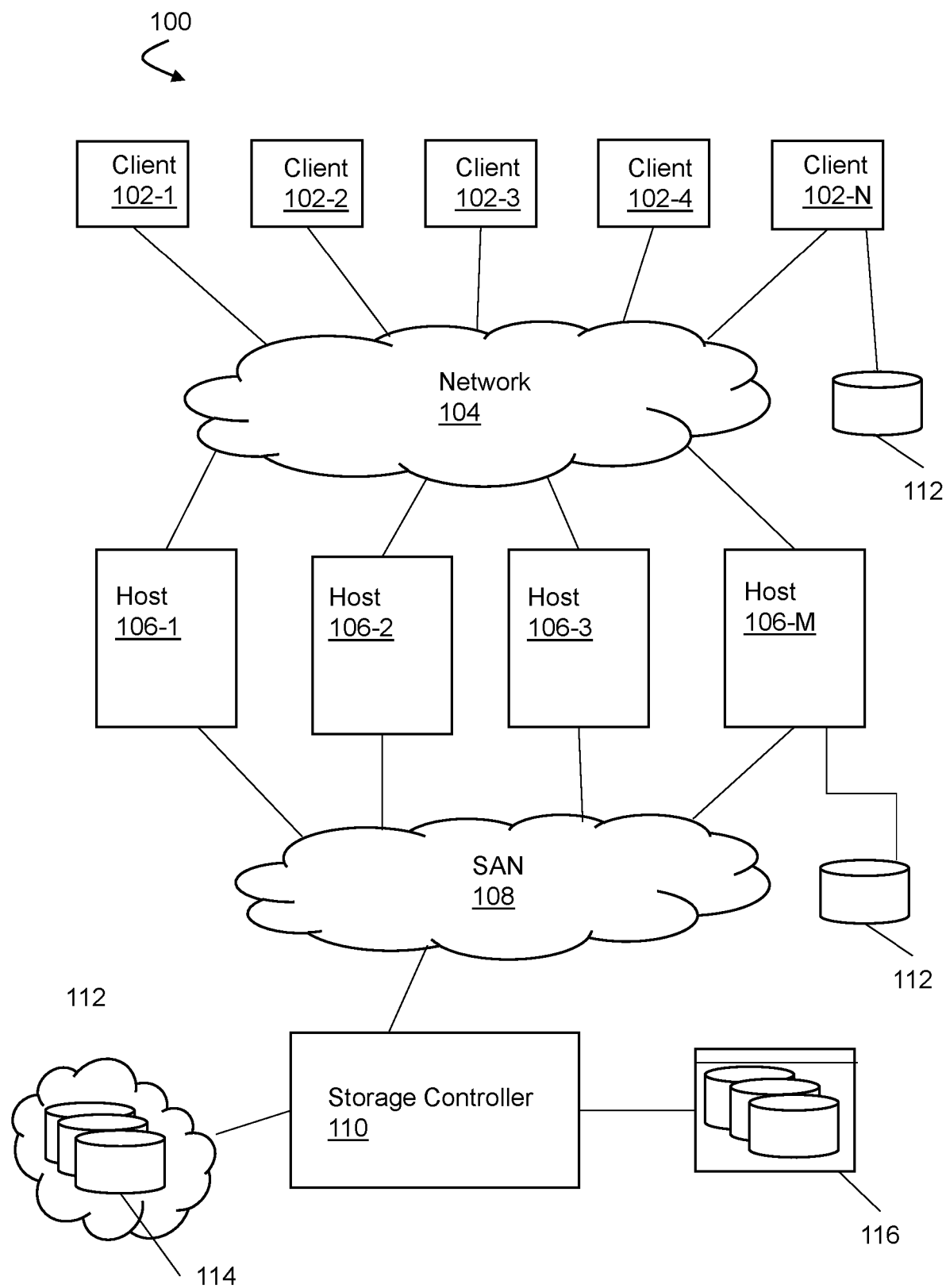
FIG. 1 is a high-level block diagram depicting one embodiment of an example network environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

FIG. 1 is a high-level block diagram depicting one embodiment of an example network architecture 100. The network architecture 100 is presented only by way of example and not limitation. Indeed, the systems and methods disclosed herein may be applicable to a wide variety of different network architectures in addition to the network architecture 100 shown in FIG. 1.

As shown, the network architecture 100 includes one or more clients or client computers 102-1 . . . 102-N, where N is the total number of client computers, and one or more hosts 106-1 . . . 106-M, where M is the total number of hosts (also referred to herein as "server computers" 106, "host systems" 106, or "host devices" 106). It is to be understood that although five clients 102 are shown in FIG. 1, other numbers of clients 102 can be used in other embodiments. For example, in some embodiments only one client 102 is implemented. In other embodiments, more than five or fewer than 5 clients 102 are used. Similarly, it is to be understood that although four hosts 106 are shown in FIG. 1, any suitable number of hosts 106 can be used. For example, in some embodiments, only a single host 106 is used. In other embodiments, more than four or fewer than four storage hosts 106 can be used.

Each of the client computers 102 can be implemented as a desktop computer, portable computer, laptop or notebook computer, netbook, tablet computer, pocket computer, smart phone, or any other suitable type of electronic device.

Similarly, each of the hosts 106 can be implemented using any suitable host computer or server. Such servers can include, but are not limited to, IBM System z® and IBM System i® servers, as well as UNIX servers, Microsoft Windows servers, and Linux platforms.

The client computers 102 are communicatively coupled to hosts 106 via a network 104. The network 104 may include, for example, a local-area-network (LAN), a wide-area-network (WAN), the Internet, an intranet, or the like. In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). In the example shown in FIG. 1, the network 108 connects the servers 106 to one or more storage sub-systems 110. Although only one storage sub-system 110 is shown for purposes of illustration, it is to be understood that more than one storage sub-system 110 can be used in other embodiments. The storage sub-system 110 manages connections to arrays of storage devices 116. The arrays of storage devices 116 can include arrays of hard-disk drives and/or solid-state drives. In addition, in the example shown in FIG. 1, the storage sub-system 110 is configured to connect to and create storage arrays from cloud storage such that the cloud storage appears as a local storage array which enables advanced data management features, as described in more detail below.

In addition, in conventional systems data cold data (e.g. data which is not accessed frequently) can be placed on relatively slower storage media (e.g. spinning disks) with data accessed more frequently located on faster media (e.g. solid state disks). As the data categorized as cold data grows and ages, conventional systems leave the cold data alone until more disk space is needed and then additional storage space is added which can be an expensive and time intensive process. If the amount of cold data then subsequently decreases, there is more storage space than what is needed. By enabling the creation of cloud based ranks which appear as local ranks to the enterprise storage system, the embodiments described herein enable more efficient dynamic relocation of data, as described in more detail below. In particular, an additional category of data based on data accesses is created. This additional category is defined to include data which has not been accessed for an extended period of time. This new category of data can then be moved or relocated to the cloud based ranks, as described in more detail below. Thus, new ranks (i.e. cloud based ranks) are created as needed and can be deleted when not needed which saves space for relatively faster local ranks, while still enabling the advanced management features not typically available for remote storage.

To access a storage sub-system 110, a host system 106 may communicate over physical connections from one or more ports on the host 106 to one or more ports on the storage sub-system 110. A connection may be through a switch, fabric, direct connection, or the like. In certain embodiments, the servers 106 and storage sub-systems 110 may communicate using a networking standard such as Fibre Channel (FC) or iSCSI.

Figure 2:
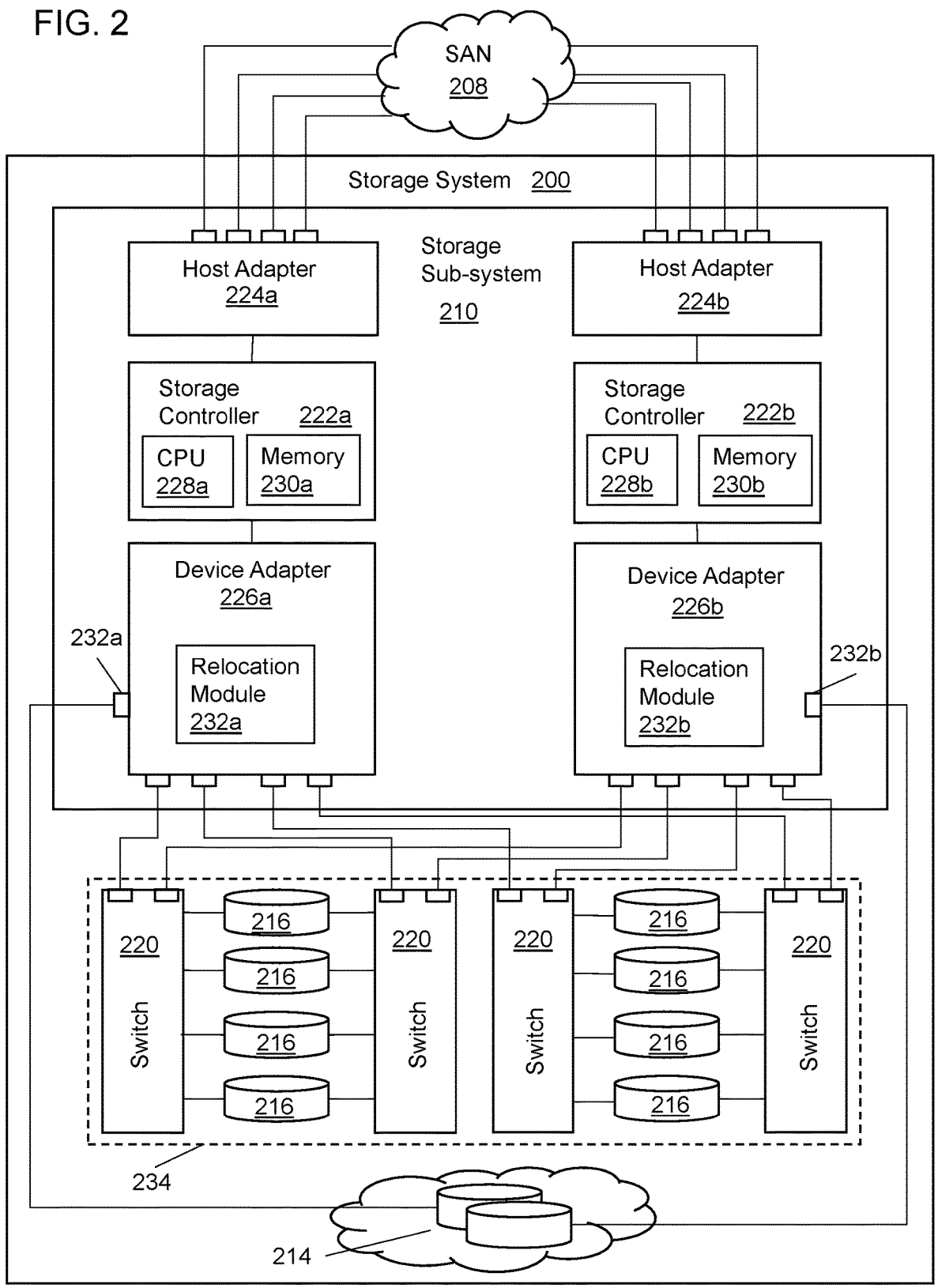
FIG. 2 is a high-level block diagram depicting one embodiment of an example storage system.

FIG. 2 is a high-level block diagram of one embodiment of a storage system 200. Storage system 200 includes one or more arrays of storage drives (e.g., hard-disk drives and/or solid-state drives). As shown, the storage system 200 includes a storage sub-system 210, a plurality of switches 202, and a plurality of storage drives 216 such as hard disk drives and/or solid-state drives (such as flash-memory-based drives). The storage sub-system 210 may enable one or more hosts (e.g., open system and/or mainframe servers) to access data in the plurality of storage drives 216.

In some embodiments, the storage sub-system 210 includes one or more storage controllers 222. In the example shown in FIG. 2, the storage sub-system includes storage controller 222a and storage controller 222b. Although only two storage controllers 226 are shown herein for purposes of explanation, it is to be understood that more than two storage controllers can be used in other embodiments. The storage sub-system 210 in FIG. 2 also includes host adapters 224a, 224b and device adapters 226a, 226b to connect the storage sub-system 210 to host devices and storage drives 204, respectively. Multiple storage controllers 222a, 222b provide redundancy to help ensure that data is available to connected hosts. Thus, when one storage controller (e.g. storage controller 222a) fails, the other storage controller (e.g. 222b) can pick up the I/O load of the failed storage controller to ensure that I/O is able to continue between the hosts and the storage drives 204. This process can be referred to as a "failover."

Each storage controller 222 can include respective one or more processors 228 and memory 230. The memory 230 can include volatile memory (e.g., RAM) as well as non-volatile memory (e.g., ROM, EPROM, EEPROM, flash memory, etc.). The volatile and non-volatile memory can store software modules that run on the processor(s) 228 and are used to access data in the storage drives 204. The storage controllers 222 can host at least one instance of these software modules. These software modules can manage all read and write requests to logical volumes in the storage drives 204.

In particular, each storage controller 222 is communicatively coupled to the storage drives 204 via a respective device adapter 226. Each device adapter 226 is configured to manage Input/Output (I/O) accesses (also referred to herein as data access requests or access requests) to the storage drives 216. For example, the device adapters 226 logically organize the storage drives 216 and determine where to store data on the storage drives 216. The storage drives 216 (also referred to as disk drive modules (DDM)) can include groups of different types of drives having different performance characteristics. For example, the storage drives 216 can include a combination of (relatively) slow 'nearline' disks (e.g. 7,200 revolutions per minute (RPM) rotational speed), SAS disk drives (e.g. 10 k or 15 k RPM) and relatively fast solid state drives (SSD).

The device adapters 226 are coupled to the storage drives 216 via switches 220. Each of the switches 220 can be fiber switches coupling the storage drives 216 to the device adapters via fiber optic connections. The device adapters 226 logically group the storage drives 216 into array sites 234. For purposes of illustration, a single array site 234 comprised of storage drives 216 is depicted in FIG. 2. However, it is to be understood that more than one array site comprised of storage drives 216 can be included in other embodiments. The array site 234 can be formatted as a Redundant Array of Independent Disks (RAID) array 234. It is to be understood that any type of RAID array (e.g. RAID 0, RAID 5, RAID 10, etc.) can be used. Each RAID array is also referred to as a rank. Each rank is divided into a number of equally sized partitions referred to as extents. The size of each extent can vary based on the implementation. For example, the size of each extent can depend, at least in part, on the extent storage type. The extent storage type (e.g. Fixed Block (FB) or count key data (CKD)) is dependent on the type of host coupled to the storage sub-system (e.g. open-systems host or mainframe server). The extents are then grouped to make up logical volumes.

The storage sub-system 210 can enable various management features and functions, such as, but not limited to, full disk encryption, non-volatile storage (NVS) algorithms (e.g. thresholding, stage, destage), storage pool striping (rotate extents), dynamic volume expansion, dynamic data relocation, intelligent write caching, and adaptive multi-stream prefetching. One example of a storage system 210 having an architecture similar to that illustrated in FIG. 2 is the IBM DS8000™ series enterprise storage system. The DS8000™ is a high-performance, high-capacity storage sub-system providing disk and solid-state storage that is designed to support continuous operations. Nevertheless, the embodiments disclosed herein are not limited to the IBM DS8000™ series enterprise storage system, but can be implemented in any comparable or analogous storage system or group of storage systems, regardless of the manufacturer, product name, or components or component names associated with the system. Thus, the IBM DS8000™ is presented only by way of example and is not intended to be limiting.

Additionally, in the embodiment shown in FIG. 2, each of the device adapters 226 includes a respective network port 232, such as an Ethernet port, which communicatively couples the device adapter 226 to cloud storage devices 214 via a network, such as the internet. In the example shown in FIG. 2, each device adapter 226 further includes a respective relocation module 232 which is configured to allocate and group cloud storage devices 214 into virtual RAID arrays, such that the cloud storage devices 214 appear to the storage controllers 2226 as a local RAID array or rank. In this way, the features and functions of the storage controllers 226 that are available for local ranks, such as RAID array 234, are also available for the cloud rank 214.

As described in more detail below with respect to FIGS. 3 and 4, the relocation module 232 is configured to convert between storage controller commands and/or I/O accesses and cloud interface commands and/or I/O accesses. It is to be noted that although a relocation module 232 is included in the device adapters 226 in this example, the relocation module 232 can be included in storage controllers 222 in other embodiments. In particular, in some embodiments, each storage controller 222 includes a respective relocation module that does the conversion for commands to the respective device adapter 226.

Thus, the embodiments described herein enable advantages over conventional cloud storage systems. For example, conventional cloud storage systems typically enable relatively basic functionality, such as remote archiving, backup, and retrieval. However, such conventional systems are unable to perform advanced management functions on the data stored in the cloud, such as the management functions mentioned above (e.g. NVS algorithms such as thresholding, stage, and destage). Thus, through the use of the relocation module 232, discussed in more detail below, the embodiments described herein enable the performance of advanced management features on data stored on cloud storage devices which is not available for conventional cloud storage systems. In particular, through the use of the relocation module 232, the storage controllers 222 and device adapters 226 are able to access and utilize the virtual RAID arrays or ranks comprised of cloud storage as if the virtual RAID arrays were local drives coupled to the device adapters 226 rather than as remote storage. In this way, the same management features/functionality available for local drives, such as those mentioned above, are available for the remote cloud storage without modifying the underlying code and/or hardware associated with implementing those management features.

Furthermore, by creating virtual RAID arrays that appear as local storage to the storage sub-system 210, the embodiments described herein provide a solution to a problem of efficient data relocation. In particular, the relocation module 232 is configured to monitor data accesses to data on the plurality of storage devices of one or more RAID arrays (e.g. array 234) in the storage system. Based on the monitored accesses, the relocation module 232 can identify a plurality of categories of data. For example, in some embodiments, the relocation module 232 identifies a hot data category, a cold data category and an extremely cold data category. The hot data category corresponds to data which has data accesses within a first time period. The cold data category corresponds to data which has not had a data access within the first time period, but has had a data access within a second time period that is longer or greater than the first time period. The extremely cold data category corresponds to data which not had a data access within the first or second time periods. In other words, data in the extremely cold data category has not had a data access for more than the second time period. As described in more detail below, the relocation module 232 is configured to move data in the extremely cold category to one or more of the cloud based ranks. Thus, the relocation module 232 can be configured to create the cloud based ranks if space is not available on an existing cloud based rank of the storage system 200.

Figure 3:
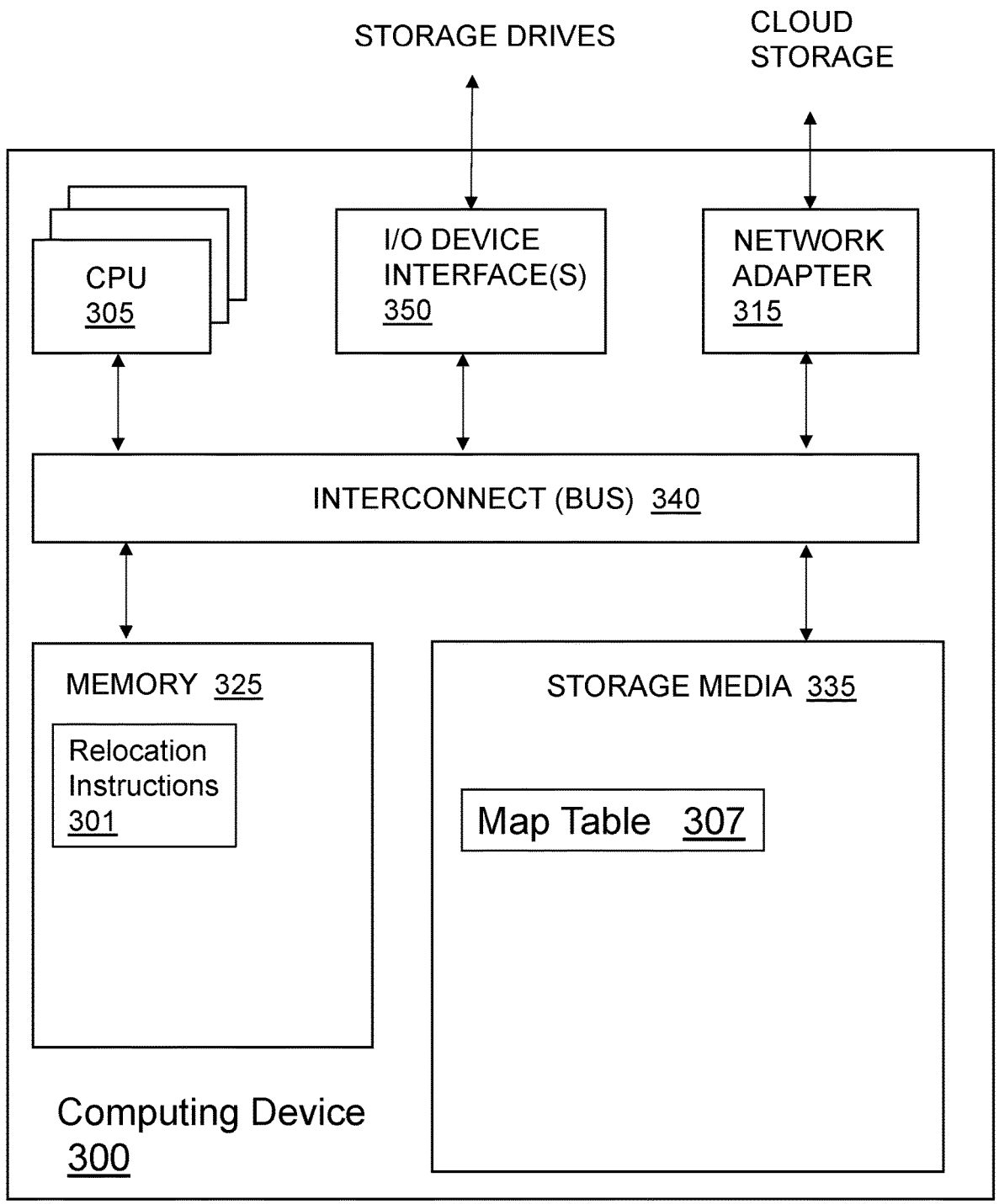
FIG. 3 is a block diagram of one embodiment of an example device adapter.

FIG. 3 is a block diagram of one embodiment of an example computing device 300 which can be implemented as a device adapter, such as device adapters 226 or a storage controller, such as storage controllers 222. For purposes of explanation, computing device 300 is described herein with respect to a device adapter. In the example shown in FIG. 3, the device adapter 300 includes a memory 325, storage 335, an interconnect (e.g., BUS) 340, one or more processors 305 (also referred to as CPU 305 herein), an I/O device interface 350, and a network adapter or port 315.

Each CPU 305 retrieves and executes programming instructions stored in the memory 325 and/or storage 335. The interconnect 340 is used to move data, such as programming instructions, between the CPU 305, I/O device interface 350, storage 335, network adapter 315, and memory 325. The interconnect 340 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 335 is generally included to be representative of a non-volatile memory, such as a hard disk drive, solid state device (SSD), removable memory cards, optical storage, or flash memory devices.

In some embodiments, the memory 325 stores relocation instructions 301 and the storage 335 stores map table 307. However, in various embodiments, the relocation instructions 301 and the map table 307 are stored partially in memory 325 and partially in storage 335, or they are stored entirely in memory 325 or entirely in storage 335.

When executed by the CPU 305, the relocation instructions 301 cause the CPU 305 to utilize the map table 307 to implement the relocation module discussed above with respect to FIG. 2. It is to be noted that although the relocation instructions 301 and map table 307 are depicted as being stored in and executed/utilized by a device adapter 300, in other embodiments the relocation instructions 301 and map table 307 can be stored on and executed/utilized by a storage controller such as storage controller 222a and/or storage controller 222b shown in FIG. 2. The relocation instructions 301 cause the CPU 305 to allocate space on cloud storage devices, such as cloud storage devices 214 depicted in FIG. 2. The space can be allocated statically or on demand as need arises. For example, the space can be allocated a priori or at run time. Furthermore, the cloud storage ranks can be created with different storage capacity.

The relocation instructions 301 further cause the CPU 305 to group the allocated storage into one or more virtual ranks and to store a mapping between the cloud storage devices and the one or more virtual ranks in the map table 307. In particular, the relocation instructions 301 cause the CPU 305 to generate the map table 307 which maps the allocated storage space to corresponding virtual local addresses and groups the virtual local addresses to create one or more virtual local ranks or RAID arrays. In this way, the virtual ranks of cloud storage appear as local direct attached ranks to a storage controller communicatively coupled to the device adapter 300 via the I/O device interfaces 350. The I/O device interfaces 350 also communicatively couple the device adapter 300 to local ranks of storage devices, such as solid state drives and nearline drives (e.g. storage drives 216 discussed above). For example, the I/O device interfaces 350 can include fiber optic ports. As used herein, a local rank is a rank or RAID array comprised of storage devices that are directly connected to the device adapter 300 without an intervening wide area network, such as the internet.

When an I/O access (e.g. a read or write request) is received, the cloud conversion instructions 301 cause the CPU 305 to determine if the request is directed to data stored on a virtual rank of cloud storage. When the request is directed to data stored on a virtual rank of cloud storage, the relocation instructions 301 convert the I/O access (also referred to herein as a data access request or access request) for transmission to the cloud storage device via a cloud interface. For example, the relocation instructions 301 can convert the I/O access using commands, format, device address, etc. used by the cloud interface to access the cloud storage devices. As used herein, the terms I/O access, read/write access, and data access can be used interchangeably. Exemplary cloud interfaces can include, but are not limited to, the IBM® Cloud Manager or the Amazon® Simple Storage Service (Amazon S3) interface. Thus, as discussed above, the relocation instructions 301 transparently makes cloud storage available to a storage controller similar to other local storage devices.

In addition, the relocation instructions 301 cause the CPU 305 to dynamically relocate data which is not accessed frequently to improve efficiency of the storage system. In particular, the relocation instructions 301 cause the CPU 305 to dynamically relocate data to cloud based ranks that have not been accessed for more than a predetermined amount of time. For example, the relocation instructions 301 can be configured to cause the CPU 305 to perform the dynamic relocation described in more detail with respect to FIG. 4.

In addition, the relocation instructions 303 are configured, in some embodiments to cause the CPU 305 to assign a service level to the cloud based ranks. In some such embodiments, there are three levels of service. However, in other embodiments providing multiple levels of service, two or more than 3 levels of service can be provided. In this example, three levels of service are utilized and the selection of the level of service is based on the compressibility of the data being mirrored, a respective input/output data rate for the virtual local ranks, and a service level agreement. For example, if a service level agreement indicates a low quality of service, the I/O data rate for the virtual local rank is below a threshold, and the data being accessed is compressible, then a first level of service is selected. A low quality of service can be any quality of service below a pre-defined threshold level of service. The first level of service is the lowest level of service from the three options in this example. For example, it can include higher latencies and lower throughput than the other two levels of service. If the service level agreement indicates a low quality of service, the I/O data rate for the virtual local rank is below a threshold, and the data is not compressible, then the second level of service is selected. The second level of service has greater throughput and/or less latency than the first level of service. The last or third level of service is used for all other data (e.g. the SLA indicates a level of service above the pre-defined threshold and/or the I/O data rate is above a threshold). The third level of service has greater throughput and/or less latency than both the first and second levels of service.

By providing differing levels of service, the device adapter 326 is able to leverage the virtual ranks of cloud storage to provide greater flexibility in meeting the customer needs for data storage and access. It is to be noted that although the example first, second, and third levels are described as differing in latency and throughput, other factors can be used to differentiate the levels of service. For example, in some embodiments, the three levels of service have the same latency and throughput, but differ in cost and redundancy level.

Figure 4:
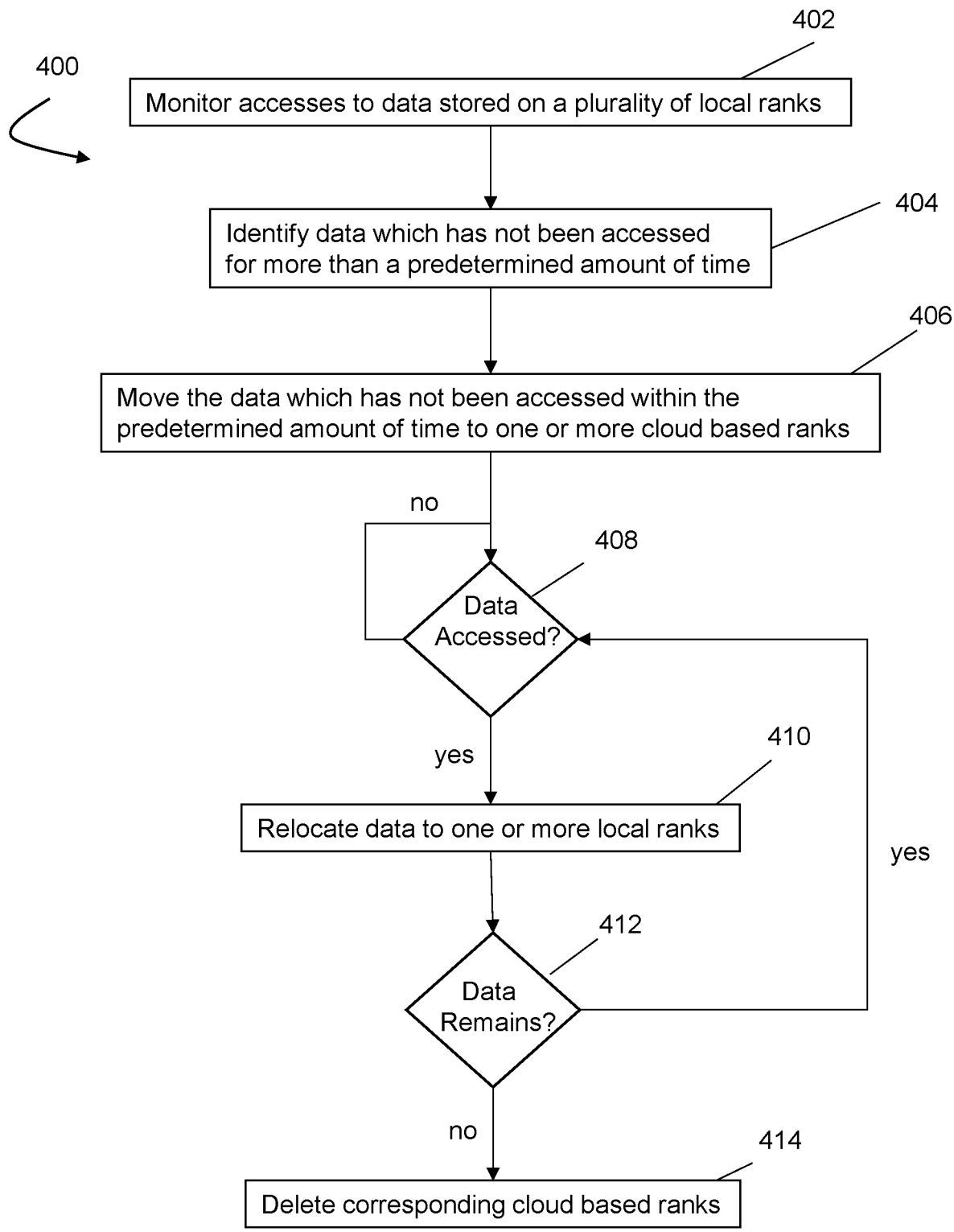
FIG. 4 is a flow chart depicting one embodiment of an example method of dynamic data relocation.

FIG. 4 is a flow chart depicting one embodiment of a method 400 of dynamic data relocation. The method 400 can be implemented by a device adapter, such as device adapters 226, or a storage controller, such as storage controllers 222. For example, the method 400 can be implemented by a CPU, such as CPU 305 in computing device 300, executing instructions, such as relocation instructions 301. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, accesses to data stored on a plurality of local ranks of an enterprise storage system is monitored. For example, device adapter and/or storage controller can be configured to count the number of accesses to data as well as track the time at which the data accesses occur. At block 404, data which has not been accessed for more than a predetermined amount of time. In some embodiments, the predetermined amount of time is a specified number of weeks. In other embodiments, the predetermined amount of time is a specified number of days. In other embodiments, other amounts of time are used.

In some embodiments, the data stored on the plurality of local ranks or RAID arrays is categorized into a plurality of categories based on the monitored data accesses. For example, in some such embodiments, three categories of data are used, as discussed above. In other embodiments, 4 or more categories are used. Each of the categories can be defined by the frequency of data accesses. For example, in some embodiments, the most frequently accessed (or hot data) is data which is accessed within a first, shortest time period. Similarly, data which is not accessed within the first, shortest time period, but is accessed within a second time period longer than the first time period is categorized into a second category (e.g. cold data). Thus, differing time periods can define the different categories of data. In other embodiments, the number of accesses which occur within a given amount of time can be used to define the different categories. Regardless of the manner of defining the different categories, identifying the data which has not been accessed for the predetermined amount of time involves identifying the data which is least frequently accessed. For example, if multiple time periods are used to define a plurality of categories, the predetermined amount of time used at block 404 is the longest period of time.

At block 406, the data which has not been accessed within the predetermined amount of time is moved to one or more cloud based ranks of the enterprise storage system. Each cloud based rank comprises storage space on one or more cloud storage devices. The storage space on the one or more cloud storage devices is mapped to corresponding virtual local addresses that are grouped as a virtual local rank, as discussed above.

Moving the data to a cloud based rank can include creating the cloud based rank. For example, in response to determining that a cloud based rank is not available that has sufficient space for the data identified at block 404 (e.g. the existing cloud based ranks do not have enough space or no cloud based ranks currently exist), the device adapter or storage controller can create one or more new cloud based ranks. Creating one or more new cloud based ranks includes allocating storage space on one or more corresponding cloud storage devices via a cloud interface. A cloud interface is an interface configured to enable access to the cloud storage devices. For example, the cloud interface can be implemented as an application programming interface (API). Example cloud interfaces are discussed above. Allocating the cloud storage can include requesting via the cloud interface a specified amount of storage. This storage space can be requested statically before needed or dynamically as storage space is needed. Additionally, as used herein, cloud storage devices are storage devices accessed via a wide area network, such as the internet, as opposed to a local area network or direct communication link.

Creating the new cloud based ranks further includes mapping the allocated storage space to corresponding virtual local addresses. For example, in some embodiments, the device adapter or storage controller assigns the allocated storage space to corresponding virtual local addresses. As used herein, a virtual local address is a memory address which appears as an address of a storage device coupled to the device adapter via a local connection. A local connection refers to a connection that is not over a wide area network or remote network, such as the internet.

Creating the new cloud based ranks further includes grouping the virtual local addresses as virtual local ranks. For example, the device adapter or storage controller is configured to group or arrange the virtual local addresses so that they appear to be directly connected to the device adapter as a local RAID array of storage devices.

Furthermore, in some embodiments, moving the data identified at block 404 includes waiting to move the data until a predetermined condition is met. For example, in some such embodiments, moving the data identified at block 404 includes determining the size of the data identified at block 404 and moving the data in response to determining that the size of the data exceeds a predetermined size threshold. For example, the size threshold can be set to 1 gigabyte, 10 gigabytes, or 100 gigabytes, etc., in some embodiments. In other embodiments, the size is determined as a function of extent sizes on the one or more local RAID arrays.

In other embodiments, the device adapter or storage controller are configured to wait to move the data identified at block 404 based on the amount of available space on the one or more local RAID arrays. For example, in some such embodiments, moving the data identified at block 404 includes determining the amount of available space remaining on the plurality of local ranks and comparing the amount of available space to a predetermined available space threshold. Once the available space on the plurality of local ranks drops below the threshold, the device adapter or storage controller directs moving the data to the cloud based ranks.

At block 408, it is determined if a data access request for at least part of the data on the cloud based ranks has been received. A data access request for data on the cloud based ranks includes an access request directed to the corresponding virtual local addresses for at least part of the data moved, at block 406, to the cloud based ranks. The device adapter or storage controller is configured to convert the access request to a cloud data access request configured for an application programming interface (API) corresponding to the one or more cloud storage devices of the one or more cloud based ranks.

If a data access request has not been received for at least part of the data moved to the cloud based ranks, the method 400 loops at block 408 until a data access request is received. If a data access request is received for at least part of the data moved to the cloud based ranks, then the requested data is relocated to one or more storage drives of one or more local RAID arrays, at block 410.

At block 412, it is determined if data still remains on the cloud based ranks. If data still remains on each of the cloud based ranks, then method 400 loops to block 408. If data does not remain on one or more of the cloud based ranks, then the corresponding cloud based ranks which do not have any more data stored thereon are deleted at block 414. Deleting the cloud based ranks includes deallocating the storage space and deleting corresponding entries in the map table. In this way, the cloud based ranks can be dynamically created and deleted as storage space is needed.

As stated above, the order of actions in example method 400 is provided for purposes of explanation and method 400 can be performed in a different order and/or some actions can be omitted or additional actions can be included in other embodiments. Similarly, it is to be understood that some actions can be omitted or additional actions can be included in other embodiments. For example, in some embodiments, blocks 412 and 414 are omitted. In such embodiments, the cloud based ranks are not deleted even if no more data remains on one or more of the cloud based ranks after relocating data to one or more of the local RAID arrays. Additionally, it is to be understood that acts do not need to be performed serially. For example, the monitoring and identifying described in blocks 402 and 404 can occur at the same time or overlap with the other acts described in method 400.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a computer-implemented method for dynamic data relocation. The method comprises monitoring accesses to data stored on a plurality of local ranks of an enterprise storage system; identifying data which has not been accessed for a predetermined amount of time based on the monitored accesses; and moving the data which has not been accessed for the predetermined amount of time to one or more cloud based ranks of the enterprise storage system, wherein each cloud based rank comprises storage space on one or more cloud storage devices, the storage space on the one or more cloud storage devices mapped to corresponding virtual local addresses that are grouped as a virtual local rank.

Example 2 includes the computer-implemented method of example 1, further comprising, in response to an access request directed to the corresponding virtual local addresses for at least part of the moved data, converting the access request to a cloud data access request configured for an application programming interface (API) corresponding to the one or more cloud storage devices of the one or more cloud based ranks; and relocating the at least part of the moved data from the one or more cloud based ranks to at least one of the plurality of local ranks.

Example 3 includes the computer-implemented method of example 2, further comprising determining that all of the moved data has been relocated to at least one of the plurality of local ranks; and deleting the one or more cloud based ranks.

Example 4 includes the computer-implemented method of any of examples 1-3, wherein the predetermined amount of time comprises one of a predetermined number of weeks or a predetermined number of days.

Example 5 includes the computer-implemented method of any of examples 1-4, wherein moving the data comprises, in response to determining that a cloud based rank having sufficient storage space is not available, creating one or more new cloud based ranks. Creating each of the one or more new cloud based ranks comprises allocating storage space on one or more corresponding cloud storage devices via a cloud interface; mapping the allocated storage space to corresponding virtual local addresses; and grouping the virtual local addresses as a virtual local rank.

Example 6 includes the computer-implemented method of any of examples 1-5, wherein moving the data comprises moving the data which has not been accessed for the predetermined amount of time to the one or more cloud based ranks in response to determining that the size of the data which has not been accessed for the predetermined amount of time exceeds a predetermined size threshold.

Example 7 includes the computer-implemented method of any of examples 1-5, wherein moving the data comprises moving the data which has not been accessed for the predetermined amount of time to the one or more cloud based ranks in response to determining that available space on the plurality of local ranks is less than a predetermined available space threshold.

Example 8 includes a storage system. The storage system comprises a host adapter having one or more ports configured to communicatively couple the host adapter to one or more host devices; a storage controller comprising a processor and a memory, the storage controller communicatively coupled to the host adapter; and a device adapter comprising a processor and a memory, the device adapter communicatively coupled to the storage controller. The device adapter further comprises a plurality of ports communicatively coupled to a plurality of local storage drives and at least one network port communicatively coupled to a plurality of cloud storage devices via a network. One of the device adapter and the storage controller is further configured implement a data relocation module. The data relocation module is configured to monitor accesses to data stored on a plurality of local redundant array of independent disks (RAID) arrays of an enterprise storage system; identify data which has not been accessed for a predetermined amount of time based on the monitored accesses; and move the data which has not been accessed for the predetermined amount of time to one or more cloud based RAID arrays of the enterprise storage system, wherein each cloud based RAID array comprises storage space on one or more cloud storage devices, the storage space on the one or more cloud storage devices mapped to corresponding virtual local addresses that are grouped as a virtual local RAID array.

Example 9 includes the storage system of example 8, wherein the relocation module is further configured to, in response to an access request directed to the corresponding virtual local addresses for at least part of the moved data, relocate the at least part of the moved data from the one or more cloud based ranks to at least one of the plurality of local ranks.

Example 10 includes the storage system of example 9, wherein the relocation module is further configured to delete the one or more cloud based ranks in response to determining that all of the moved data has been relocated to at least one of the plurality of local ranks.

Example 11 includes the storage system of any of examples 8-10, wherein the relocation module is configured to move the data by creating one or more new cloud based ranks in response to determining that a cloud based rank having sufficient storage space is not available. The relocation module is configured to create each of the one or more new cloud based ranks by allocating storage space on one or more corresponding cloud storage devices via a cloud interface; mapping the allocated storage space to corresponding virtual local addresses; and grouping the virtual local addresses as a virtual local rank.

Example 12 includes the storage system of any of examples 8-11, wherein the relocation module is configured to move the data which has not been accessed for the predetermined amount of time to the one or more cloud based ranks in response to determining that the size of the data which has not been accessed for the predetermined amount of time exceeds a predetermined size threshold.

Example 13 includes the storage system of any of examples 8-12, wherein the relocation module is configured to move the data which has not been accessed for the predetermined amount of time to the one or more cloud based ranks in response to determining that available space on the plurality of local ranks is less than a predetermined available space threshold.

Example 14 includes a computer program product comprising a computer readable storage medium having a computer readable program stored therein. The computer readable program, when executed by a processor, causes the processor to monitor accesses to data stored on a plurality of local redundant array of independent disks (RAID) arrays of an enterprise storage system; identify data which has not been accessed for a predetermined amount of time based on the monitored accesses; and move the data which has not been accessed for the predetermined amount of time to one or more cloud based RAID arrays of the enterprise storage system, wherein each cloud based RAID array comprises storage space on one or more cloud storage devices, the storage space on the one or more cloud storage devices mapped to corresponding virtual local addresses that are grouped as a virtual local RAID array.

Example 15 includes the computer program product of example 14, wherein the computer readable program is further configured to cause the processor to, in response to an access request directed to the corresponding virtual local addresses for at least part of the moved data, convert the access request to a cloud data access request configured for an application programming interface (API) corresponding to the one or more cloud storage devices of the one or more cloud based ranks; and relocate the at least part of the moved data from the one or more cloud based ranks to at least one of the plurality of local ranks.

Example 16 includes the computer program product of example 15, wherein the computer readable program is further configured to cause the processor to delete the one or more cloud based ranks in response to determining that all of the moved data has been relocated to at least one of the plurality of local ranks.

Example 17 includes the computer program product of any of examples 14-16, wherein the computer readable program is further configured to cause the processor to move the data by creating one or more new cloud based ranks in response to determining that a cloud based rank having sufficient storage space is not available. The relocation module is configured to create each of the one or more new cloud based ranks by allocating storage space on one or more corresponding cloud storage devices via a cloud interface; mapping the allocated storage space to corresponding virtual local addresses; and grouping the virtual local addresses as a virtual local rank.

Example 18 includes the computer program product of any of examples 14-17, wherein the computer readable program is further configured to cause the processor to move the data which has not been accessed for the predetermined amount of time to the one or more cloud based ranks in response to determining that the size of the data which has not been accessed for the predetermined amount of time exceeds a predetermined size threshold.

Example 19 includes the computer program product of any of examples 14-18, wherein the computer readable program is further configured to cause the processor to move the data which has not been accessed for the predetermined amount of time to the one or more cloud based ranks in response to determining that available space on the plurality of local ranks is less than a predetermined available space threshold.

Example 20 includes a computing device. The computing device comprises a network adapter configured to communicatively couple the computing device to one or more cloud storage devices via a network; a storage medium configured to store data; and a processor communicatively coupled to the network adapter and to the storage medium. The processor is configured to monitor accesses to data stored on a plurality of local ranks of an enterprise storage system; identify data which has not been accessed for a predetermined amount of time based on the monitored accesses; and move the data which has not been accessed for the predetermined amount of time to one or more cloud based ranks of the enterprise storage system, wherein each cloud based rank comprises storage space on one or more cloud storage devices, the storage space on the one or more cloud storage devices mapped to corresponding virtual local addresses that are grouped as a virtual local rank.

Example 21 includes the computing device of example 20, wherein the processor is further configured to, in response to an access request directed to the corresponding virtual local addresses for at least part of the moved data, convert the access request to a cloud data access request configured for an application programming interface (API) corresponding to the one or more cloud storage devices of the one or more cloud based ranks; and relocate the at least part of the moved data from the one or more cloud based ranks to at least one of the plurality of local ranks.

Example 22 includes the computing device of example 21, wherein the processor is further configured to delete the one or more cloud based ranks in response to determining that all of the moved data has been relocated to at least one of the plurality of local ranks.

Example 23 includes the computing device of any of examples 20-22, wherein the processor is further configured to move the data by creating one or more new cloud based ranks in response to determining that a cloud based rank having sufficient storage space is not available. The processor is configured to create each of the one or more new cloud based ranks by allocating storage space on one or more corresponding cloud storage devices via an application programming interface (API) associated with the corresponding one or more cloud storage devices; and generating a map table which maps the allocated storage space to corresponding virtual local addresses and groups the virtual local addresses as a corresponding virtual local rank.

Example 24 includes the computing device of any of examples 20-23, wherein the processor is further configured to move the data which has not been accessed for the predetermined amount of time to the one or more cloud based ranks in response to determining that the size of the data which has not been accessed for the predetermined amount of time exceeds a predetermined size threshold.

Example 25 includes the computing device of any of examples 20-24, wherein the processor is further configured to move the data which has not been accessed for the predetermined amount of time to the one or more cloud based ranks in response to determining that available space on the plurality of local ranks is less than a predetermined available space threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method for dynamic data relocation, the method comprising:
   monitoring accesses to data stored on at least one local rank comprising one or more storage devices coupled to a storage controller via a local connection;
   categorizing the data stored on the at least one local rank into one or more of at least three categories of data based on the monitored data accesses, the at least three categories including a first category corresponding to data that is most frequently accessed, a second category corresponding to data accessed less frequently than the data in the first category, and a third category corresponding to data that is least frequently accessed;
   relocating the data categorized in the third category to a virtual local rank comprising storage space on one or more cloud storage devices mapped to corresponding virtual local addresses that are grouped as the virtual local rank such that the virtual local rank appears to the storage controller as a local array of storage devices connected to the storage controller without an intervening wide area network;
   assigning a first service level to the virtual local rank based on a first compressibility of the data relocated to the virtual local rank, a first input/output data rate for the virtual local rank, and a service level agreement; and assigning a second service level to a second virtual local rank comprising storage space on the one or more cloud storage devices based on a second compressibility of data located on the second virtual local rank, a second input/output data rate for the second virtual local rank, and the service level agreement.

2. The computer-implemented method of claim 1, further comprising:

in response to a data access request for at least part of the data in the third category, moving the at least part of the data in the third category from the one or more cloud storage devices of the virtual local rank to at least one of the one or more storage devices of the at least one local rank.

3. The computer-implemented method of claim 2, further comprising:

in response to determining that all of the data in the third category has been moved from the virtual local rank to at least one of the one or more storage devices of the at least one local rank, deallocating the storage space on the one or more cloud storage devices and deleting entries in a map table which maps the storage space on the one or more cloud storage devices to the corresponding virtual local addresses.

4. The computer-implemented method of claim 1, wherein categorizing the data stored on the at least one local rank into one or more of the at least three categories comprises:

categorizing data which is accessed within a first, shortest time period into the first category;

categorizing data which is not accessed within the first time period, but is accessed within a second time period longer than the first time period into the second category; and categorizing data which is not accessed within the first time period or the second time period into the third category.

5. The computer-implemented method of claim 1, wherein categorizing the data stored on the at least one local rank into one or more of the at least three categories comprises categorizing the data stored on the at least one local rank based on a respective number of accesses for the data within a given amount of time, wherein data with a fewest respective number of accesses in the given amount of time is categorized into the third category.

6. The computer-implemented method of claim 1, wherein relocating the data comprises:

allocating the storage space on the one or more cloud storage devices via a cloud interface; and creating entries in a map table which maps the allocated storage space to the corresponding virtual local addresses.

7. A storage system comprising:

a host adapter having one or more ports configured to communicatively couple the host adapter to one or more host devices;

a storage controller comprising a first processor and a first memory, the storage controller communicatively coupled to the host adapter; and a device adapter comprising a second processor and a second memory, the device adapter communicatively coupled to the storage controller;

wherein the device adapter further comprises a plurality of ports communicatively coupled to a plurality of local storage drives via a local connection and at least one network port communicatively coupled to one or more cloud storage devices via a network;

wherein one of the device adapter and the storage controller is further configured to:

monitor accesses to data stored on the plurality of local storage drives;

categorize the data stored on the plurality of local storage drives into one or more of at least three categories of data based on the monitored data accesses, the at least three categories including a first category corresponding to data that is most frequently accessed, a second category corresponding to data accessed less frequently than the data in the first category, and a third category corresponding to data that is least frequently accessed;

relocate the data categorized in the third category to a virtual local rank comprising storage space on the one or more cloud storage devices that is mapped to corresponding virtual local addresses grouped as the virtual local rank such that the virtual local rank appears to the storage controller as a local array of storage devices connected to the storage controller without an intervening wide area network;

assign a first service level to the virtual local rank based on a first compressibility of the data relocated to the virtual local rank, a first input/output data rate for the virtual local rank, and a service level agreement; and assign a second service level to a second virtual local rank comprising storage space on the one or more cloud storage devices based on a second compressibility of data located on the second virtual local rank, a second input/output data rate for the second virtual local rank, and the service level agreement.

8. The storage system of claim 7, wherein one of the device adapter and the storage controller is further configured to:

in response to a data access request for at least part of the data in the third category, move the at least part of the data in the third category from the virtual local rank to at least one of the plurality of local storage drives.

9. The storage system of claim 8, wherein one of the device adapter and the storage controller is further configured to:

in response to determining that all of the data in the third category has been moved from the virtual local rank to at least one of the plurality of local storage drives, deallocate the storage space on the one or more cloud storage devices and delete entries in a map table which maps the storage space on the one or more cloud storage devices to the corresponding virtual local addresses.

10. The storage system of claim 7, wherein one of the device adapter and the storage controller is further configured to categorize the data stored on the plurality of local storage drives into one or more of the at least three categories by:

categorizing data which is accessed within a first, shortest time period into the first category;

categorizing data which is not accessed within the first time period, but is accessed within a second time period longer than the first time period into the second category; and categorizing data which is not accessed within the first time period or the second time period into the third category.

11. The storage system of claim 7, wherein one of the device adapter and the storage controller is further configured to categorize the data stored on the plurality of local storage drives into one or more of the at least three categories based on a respective number of accesses for the data stored on the plurality of local storage drives within a given amount of time, wherein data with a fewest respective number of accesses in the given amount of time is categorized into the third category.

12. The storage system of claim 7, wherein one of the device adapter and the storage controller is further configured to:
   allocate the storage space on the one or more cloud storage devices via a cloud interface; and
   create entries in a map table which maps the allocated storage space to the corresponding virtual local addresses.

13. A computer program product comprising a computer readable storage medium having a computer readable program stored therein, wherein the computer readable program, when executed by a processor, causes the processor to:
   monitor accesses to data stored on a plurality of local storage drives;
   categorize the data stored on the plurality of local storage drives into one or more of at least three categories of data based on the monitored data accesses, the at least three categories including a first category corresponding to data that is most frequently accessed, a second category corresponding to data accessed less frequently than the data in the first category, and a third category corresponding to data that is least frequently accessed;
   relocate the data categorized in the third category to a virtual local rank comprising storage space on one or more cloud storage devices that is mapped to corresponding virtual local addresses grouped as the virtual local rank such that the virtual local rank appears to a storage controller as a local array of storage devices connected to the storage controller without an intervening wide area network;
   assign a first service level to the virtual local rank based on a first compressibility of the data relocated to the virtual local rank, a first input/output data rate for the virtual local rank, and a service level agreement; and
   assign a second service level to a second virtual local rank comprising storage space on the one or more cloud storage devices based on a second compressibility of data located on the second virtual local rank, a second input/output data rate for the second virtual local rank, and the service level agreement.

14. The computer program product of claim 13, wherein the computer readable program is further configured to cause the processor to:
   in response to a data access request for at least part of the data in the third category, move the at least part of the data in the third category from the virtual local rank to at least one of the plurality of local storage drives.

15. The computer program product of claim 14, wherein the computer readable program is further configured to cause the processor to:
   in response to determining that all of the data in the third category has been moved from the virtual local rank to at least one of the plurality of local storage drives, deallocate the storage space on the one or more cloud storage devices and delete entries in a map table which maps the storage space on the one or more cloud storage devices to the corresponding virtual local addresses.

16. The computer program product of claim 13, wherein the computer readable program is further configured to cause the processor to categorize the data stored on the plurality of local storage drives into one or more of the at least three categories by:
   categorizing data which is accessed within a first, shortest time period into the first category;
   categorizing data which is not accessed within the first time period, but is accessed within a second time period longer than the first time period into the second category; and
   categorizing data which is not accessed within the first time period or the second time period into the third category.

17. The computer program product of claim 13, wherein the computer readable program is further configured to cause the processor to categorize the data stored on the plurality of local storage drives into one or more of the at least three categories based on a respective number of accesses for the data stored on the plurality of local storage drives within a given amount of time, wherein data with a fewest respective number of accesses in the given amount of time is categorized into the third category.

* * * * *